Oct. 9, 1928.
O. E. BYRON
1,686,730
TRAILER BRAKE MECHANISM
Filed Dec. 29, 1924
6 Sheets-Sheet 1
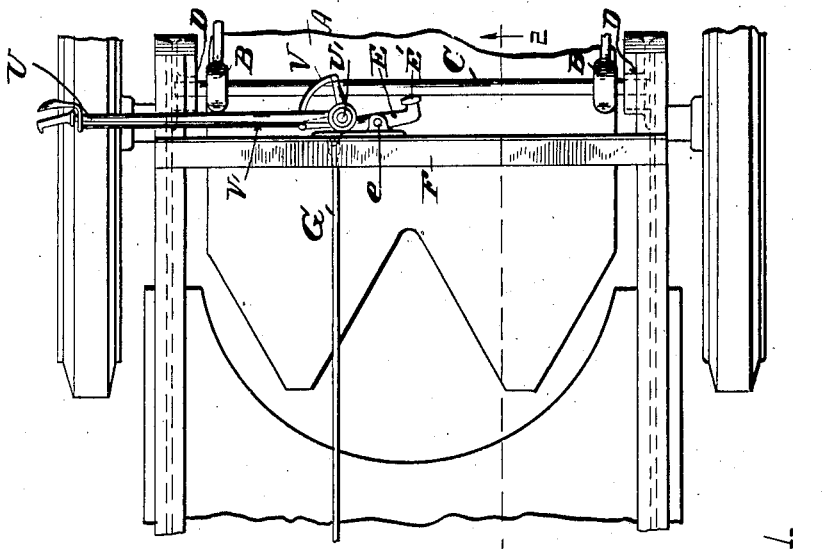
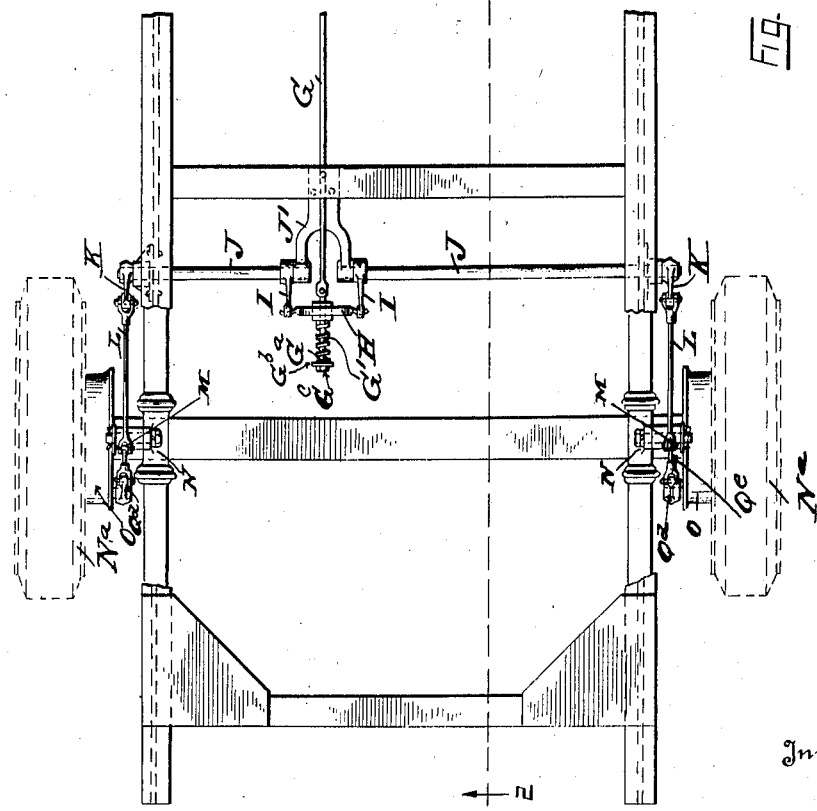
Fig. 1
Inventor
Orra E. Byron
By S. E. Thomas
Attorney Oct. 9, 1928.

O. E. BYRON 1,686,730

TRAILER BRAKE MECHANISM

Filed Dec. 29, 1924

Inventor

Orra E. Byron

By S. E. Thomas

Attorney

Oct. 9, 1928.

O. E. BYRON 1,686,730

TRAILER BRAKE MECHANISM

Filed Dec. 29, 1924

Inventor
Orra E. Byron
By S. E. Thomas
Attorney

Oct. 9, 1928.

O. E. BYRON 1,686,730

TRAILER BRAKE MECHANISM

Filed Dec. 29, 1924   6 Sheets-Sheet 4

Inventor
Orra E. Byron
By S. E. Thomas
Attorney

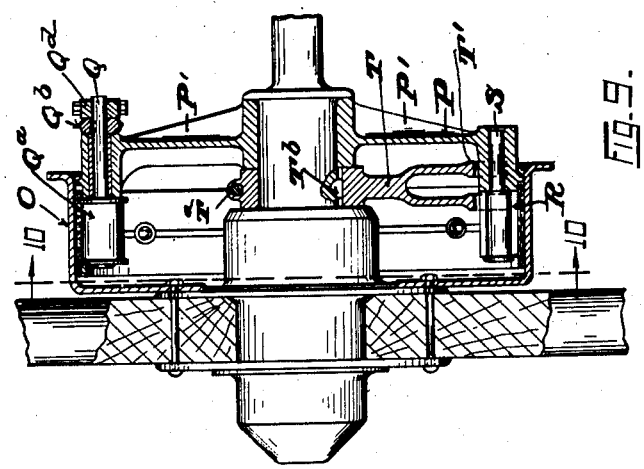
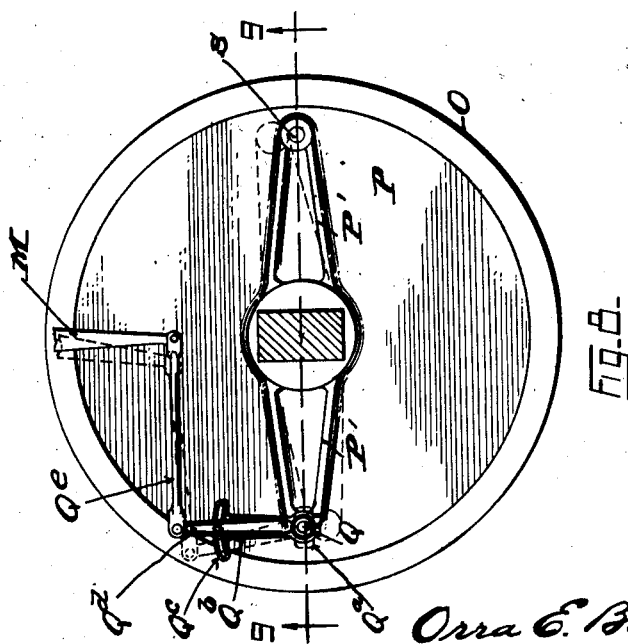

Oct. 9, 1928.
O. E. BYRON
1,686,730
TRAILER BRAKE MECHANISM
Filed Dec. 29, 1924
6 Sheets-Sheet 6
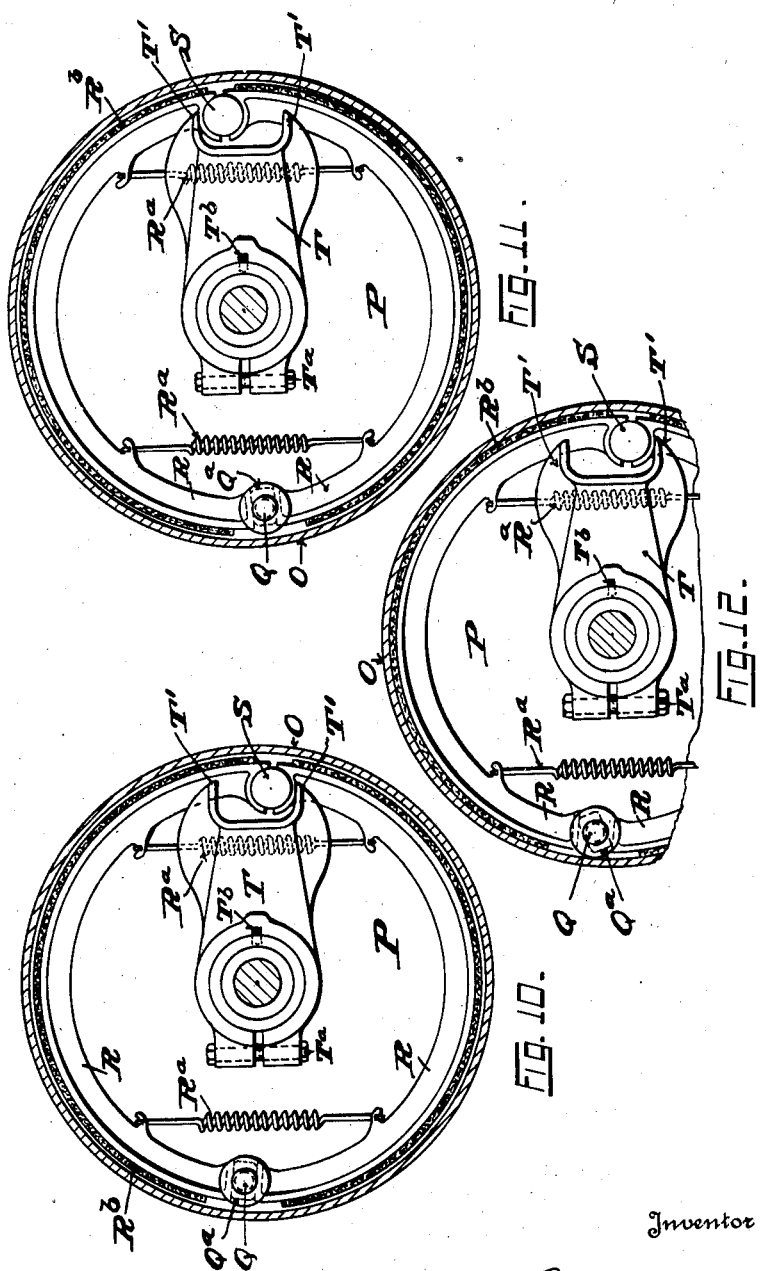

Patented Oct. 9, 1928.

1,686,730

UNITED STATES PATENT OFFICE.

ORRA E. BYRON, OF DETROIT, MICHIGAN, ASSIGNOR TO WOLVERINE TRAILER CORPORATION, OF DETROIT, MICHIGAN, A CORPORATION OF MICHIGAN.

TRAILER-BRAKE MECHANISM.

Application filed December 29, 1924. Serial No. 758,600.

My invention relates to an improvement in brake controlling mechanism for trailers adapted to be hauled by motor driven vehicles, as shown in the accompanying drawings and more particularly described in the following specification and claims.

One object of this invention is to provide a brake mechanism adapted to be automatically applied upon the sudden stoppage of the hauling vehicle, or in the event of the trailer moving more rapidly than the latter—as when travelling down grade—that the movement of the trailer may be brought under control.

A further object of the invention is to provide a brake mechanism in which the tractor and trailer when coupled together may be backed simultaneously without setting the brake mechanism of the trailer.

A further object of the invention is to provide manually operated means whereby the brake mechanism of the trailer may be set in order that the hauling vehicle may be backed into coupling relation with the trailer.

A further object of the invention is to provide resilient means to relieve an excessive application of the trailer brake mechanism, whereby the parts may not operate under stress.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a plan view of a trailer,—with parts broken away to more clearly show its braking mechanism, coupled to a fragmentary end of a hauling vehicle.

Figure 2:
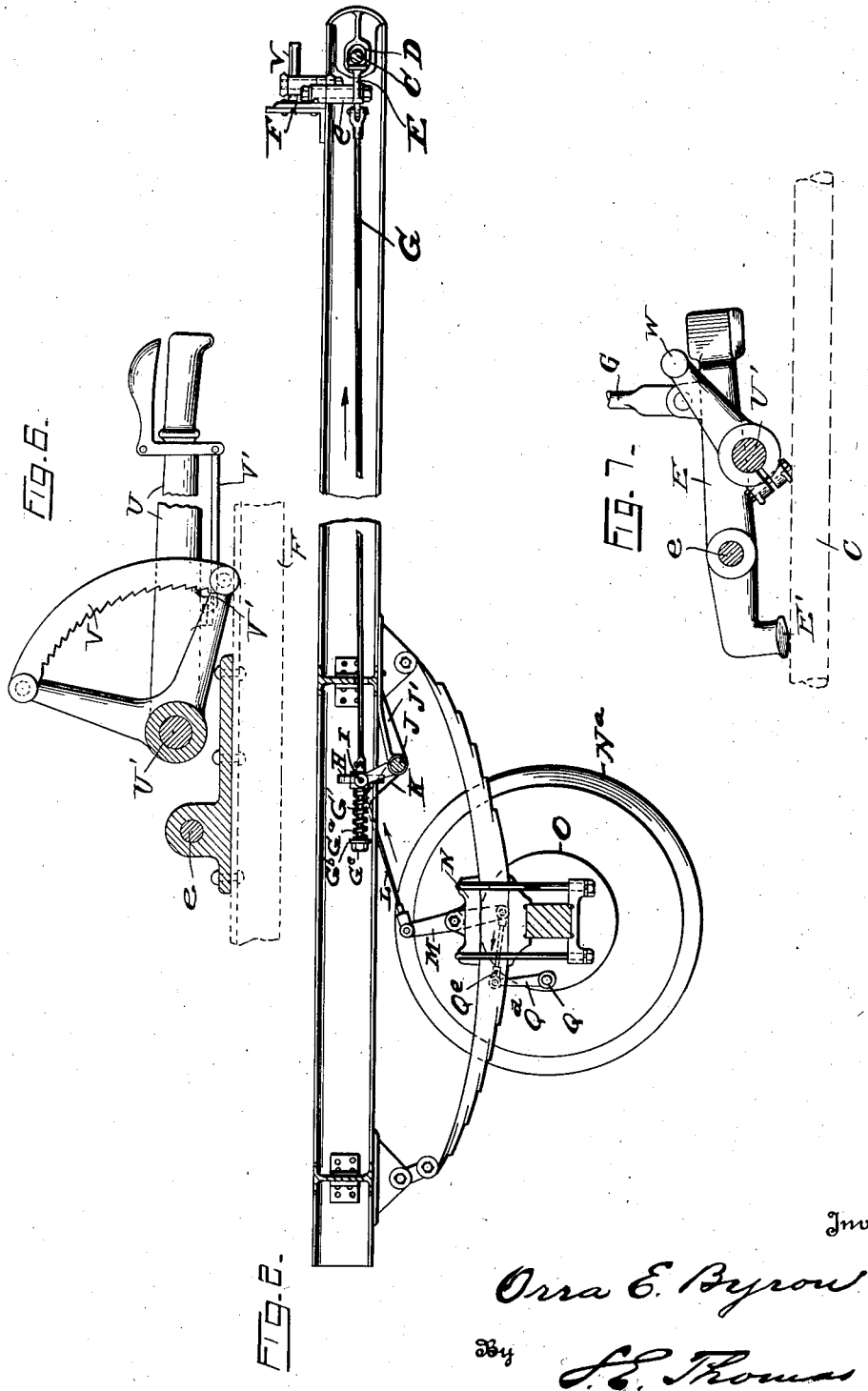
Figure 2 is a longitudinal vertical sectional view through the trailer, taken on or about line 2—2 of Figure 1,—the end of the hauling vehicle not being shown.
Figure 3:
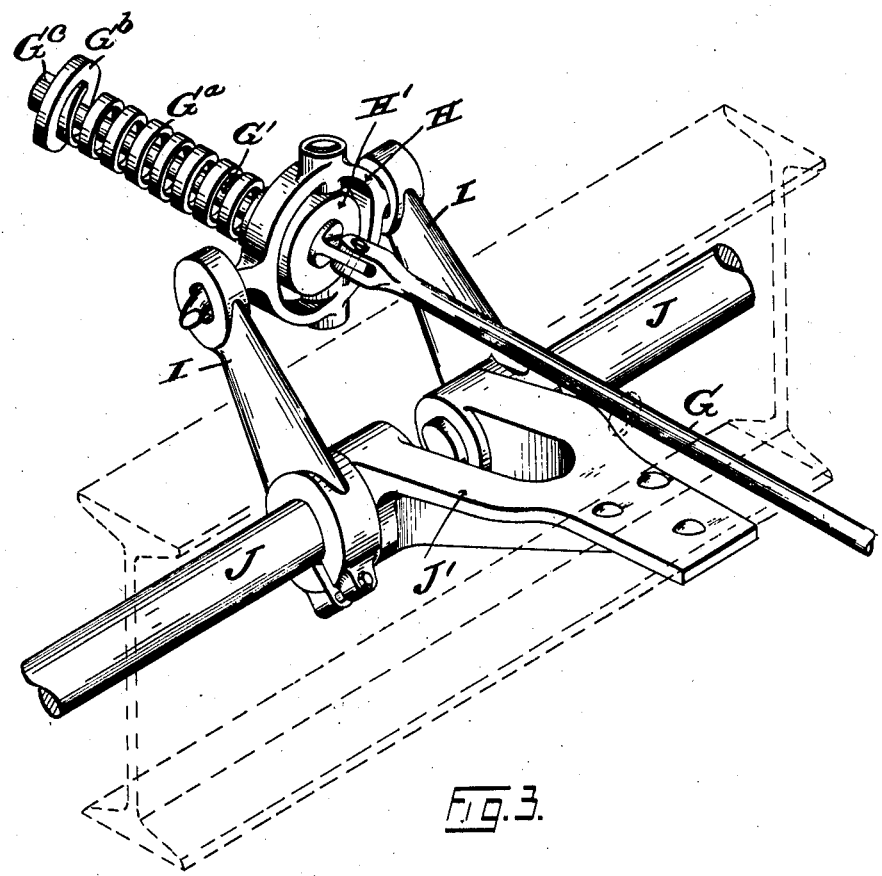
Figure 3 is a perspective view of a detail of construction showing one end of the brake rod linked to a universal spring coupling member connected with the arms of a divided equalizing rock shaft controlling the brake mechanism, whereby any excess load resulting from an undue application of the brake may be relieved.
Figure 4:
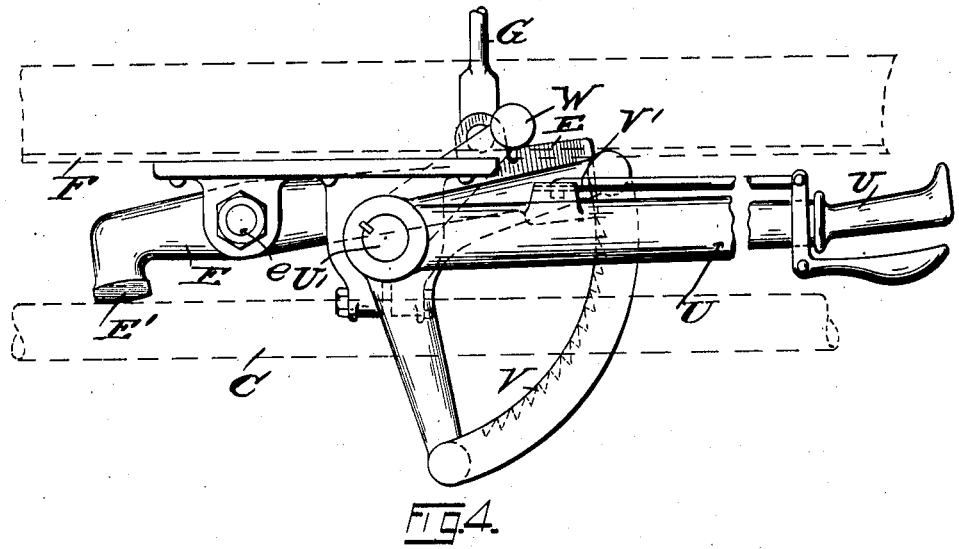

Figure 4 is an enlarged detail view of a rocking lever pivoted to a bracket carried by the frame of the trailer and connected at one end with a brake rod,—an enlarged bearing surface being shown on the other end of the lever to receive the thrust of a floating coupling bar carried by the trailer,—shown in dotted lines:—the view also shows a fragment of the manually operable lever and its segmental rack and dog for controlling the manual operation of the brake mechanism, when backing the hauling vehicle into coupling relation with a parked trailer.

Figure 5:
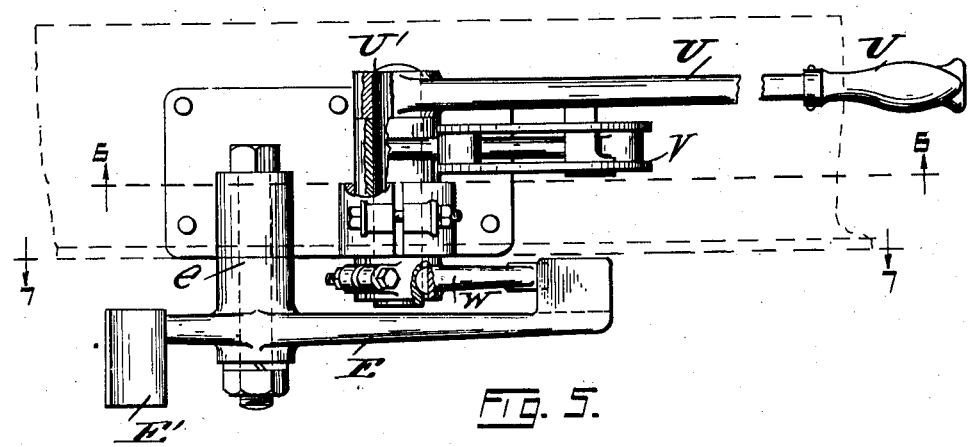

Figure 5 is a side elevation—with parts in section—of the mechanism shown in the preceding view.

Figure 6 is an inverted sectional view taken on or about line 6—6 of Figure 5.

Figure 7 is a sectional view taken on or about line 7—7 of Figure 5.

Figure 8 is an elevation of the brake drum and raised reinforcing ribs formed in the disc, also a fragment of the lever mechanism controlling the operation of the brake shoe.

Figure 9 is a cross-sectional view through the brake band and cooperating elements taken on or about line 9—9 of Figure 8.

Figure 10 is a sectional view through the brake drum taken on or about line 10—10 of Figure 9 showing the brake bands released as when the trailer is coupled to a hauling vehicle and moving forward therewith.

Figure 11 is a similar view showing the brake released as when the hauling vehicle and trailer are simultaneously moving, in a backward direction.

Figure 12 is a similar fragmentary sectional view showing the brake mechanism automatically applied to check the movement of the trailer as would occur when the trailer is coupled to the hauling vehicle upon moving at a relatively greater speed,—as when traveling down grade.

Referring now to the letters of reference placed upon the drawings:

A denotes a fragment of a motor driven hauling vehicle fitted with a suitable coupling mechanism B, adapted to engage a floating coupling bar C having a limited backward and forward movement in the slotted bearings D, forming part of the forward end of the trailer frame.

E designates a rocking lever pivoted at e to a bracket secured to a transverse member F of the trailer frame. The rocking lever E is provided with an enlarged head $E^1$ at one end to receive the thrust of the transverse coupling bar C, under certain conditions of operation which will be hereafter explained.

G designates a brake rod pivoted to the opposite end of the lever E coupled to a rod $G^1$ slidable through an annulus $H^1$ pivoted to and forming part of a universal joint member H, linked to the rocker arms I, I, of a divided equalizing shaft J;—journalled in a bracket $J^1$, bolted to a transverse member connecting the side sills of the trailer. $G^a$ represents a spring coiled upon the rod $G^1$ and bearing at one end against the annulus $H^1$ and at the other against a washer $G^b$ sleeved upon the rod $G^a$. $G^c$ denotes a nut threaded upon the end of the rod—by adjusting which the tension of the spring may be regulated.

Fitted to the ends of the equalizing shaft J are rocker arms K, K, coupled to the respective link connections L, L, in turn coupled to rocking levers M, M, journalled in the spring supporting member N secured to the axle of the trailer. $N^a$, $N^a$, indicate the wheels of a trailer and O, O, are brake drums bolted thereto.

P is a disc loosely mounted upon the axle within the brake drum having a reinforcing rib $P^1$ struck therefrom extending in opposite directions from the axle and forming at one end a bearing for the shaft Q, carrying a cam $Q^a$, extending between a pair of brake-shoes R, R,—linked together by springs $R^a$, $R^a$. $R^b$ indicates a brake lining secured to the flange of the brake-shoes.

$Q^b$ is a rocker arm—see Figures 8 and 9—keyed to the shaft Q, having a segmental rack bar $Q^c$. $Q^d$ is an arm loosely sleeved upon the shaft Q connected by a link bar $Q^e$ with the rocking lever M, adapted to be adjustably secured to the rack-bar Q of the rocker arm $Q^b$, whereby the cam $Q^a$ may be given the proper tilting movement to operate the brake-shoes.

Supported in the disc at the opposite end of the rib $P^1$ is a shaft S having a relatively large projecting end to receive the concave flanged ends of the brake-shoes which flex thereon.

T indicates a divided forked member bolted (see $T^a$) and also keyed (see $T^b$) to the axle having spaced jaws $T^1$ adapted to limit the alternate rocking movement of the disc P—upon the concave ends of the brake-shoes embracing the shaft S—contacting alternately with the respective jaws of the forked member, see Figures 10, 11 and 12.

To provide for setting the brake mechanism of the trailer when the latter is parked in order that the hauling vehicle may be backed into coupling relation therewith a manually operated lever U keyed to a shaft $U^1$, and a segmental rack bar V and locking dog $V^1$ of usual construction is employed to secure the lever when adjusted.

W indicates an arm, keyed or bolted to the shaft to which the lever U is pivoted, adapted to bear upon the rocking lever E connected with the brake rod G. It will now be seen that upon operating the lever U the trailer brake mechanism may be manually set to permit the hauling vehicle to be backed into coupling engagement with the trailer whereupon the dog controlling the brake lever U is released that the trailer may be automatically controlled through the hauling vehicle.

When manually operating the brake mechanism by means of the lever U, the spring $G^a$ on the rod $G^1$ is compressed to such an extent that when backing the hauling vehicle into the trailer it will not operate to release the brake mechanism to permit the trailer to back with the hauling vehicle, as when the brake mechanism of the trailer is controlled automatically by the hauling vehicle.

Furthermore it will be noted that the spring $G^a$ acts also as a shock absorber to relieve the brake mechanism of the stress resulting from the impact of the trailer due to a sudden stoppage of the hauling vehicle, and that by adjusting the nut $G^c$ the tension of the spring may be regulated.

Having now indicated the several parts by reference letters the construction and operation of the device will be readily understood:

Upon backing the hauling vehicle into the trailer the coupling hooks B of the former engages the floating coupling bar C of the trailer which is adapted for a limited forward and backward movement in the slotted bearings D of the trailer frame. The dog of the manually operated brake lever being then manually released—the operation of the trailer brake mechanism is thereafter automatically controlled through the hauling vehicle.

Assuming now that the hauling vehicle is moving in a forward direction, the floating bar C is drawn forward under the action of the hauling vehicle thereby freeing the rocking lever E so that its enlarged head $E^1$ may move forward with the floating coupling bar C thus releasing the brake rod G connected with the opposite end of the rocking lever and thereby the braking mechanism.

In the event of the hauling vehicle stopping or travelling at a reduced speed, the trailer moving toward the hauling vehicle at a relatively greater speed causes the rocking lever E to tilt due to its enlarged head $E^1$ contacting with the floating coupling bar C, causing the lever to tilt thereby drawing the brake rod G in a forward direction and thus setting the brake mechanism.

Attention is now directed to Figures 8 to 12 showing the brake drum and mechanism controlling the operation of the brake shoes.

When the hauling vehicle with the trailer is moving in a forward direction the brake shoes are released. The cam Q<sup>a</sup> controlling their operation being in the position shown in Figure 10 with the convex flanged ends of the brake shoes in contact with the lower jaw T¹, of the forked member T keyed to the axle.

When the hauling vehicle is stopped or caused to travel at a relatively slow speed the cam Q<sup>a</sup> will be tipped as shown in Figure 12, causing the brake shoes to expand into contact with the brake drum, due to the tilting action of the rocking lever E upon contacting with the floating coupling bar C, forcing the brake rod G in a forward direction as before explained and thereby setting the brake mechanism.

If it is desired to back the hauling vehicle and trailer the backward thrust of the coupling bar C will again tilt the rocking lever E causing the cam Q<sup>a</sup> to rock slightly—as in Figure 11—the drag of the brake shoe lining upon the brake drum shifting the brake shoes so that their convex flanged ends contact with the upper jaw T¹ of the forked member T. keyed to the axle—see Figure 11, thus releasing the brake mechanism that the trailer may be backed freely, due to the changed position of the rod Q<sup>d</sup>, as indicated in dotted lines in Figure 8 of the drawings.

Having thus described my invention what I claim is:

1. The combination of a hauling vehicle; a trailer; a brake drum secured to the wheels of the trailer; a disc having a reinforcing rib extending in opposite directions from the trailer axle with shaft bearings at each end; a stub shaft journalled in one of said bearings fitted with a cam located between the opposing ends of the brake shoes; a stub shaft supported in the other end bearing having an enlarged head projecting between the opposite ends of the brake shoes forming a joint upon which the shoes are adapted to flex when expanded by said cam; an arm keyed to the cam shaft having a segmental rack bar; an adjustable rocking lever sleeved upon said last named shaft adapted to be secured to the arm; means keyed to the axle having spaced jaws adapted to engage the brake shoes to limit their rotative movement in either direction and means for actuating said rocking arm automatically operated through a relative difference in the speed of the trailer and the hauling vehicle.

2. The combination of a hauling vehicle including means for coupling the same to the coupling bar of a trailer; a trailer fitted with a coupling bar having a limited floating movement; a rocking lever pivoted to the frame of the trailer adapted to be actuated through contact with said coupling bar; a brake rod connected with the rocking lever; an equalizing shaft fitted with rocker arms; a universal joint member connected with said rocker arms and with the brake rod; a brake mechanism and means for operably connecting the brake mechanism with the equalizing shaft.

3. The combination of a hauling vehicle including means for coupling the same to the coupling bar of a trailer; a trailer fitted with a coupling bar having a limited floating movement; a rocking lever pivoted to the frame of the trailer adapted to be actuated through contact with said coupling bar; a brake rod connected with the rocking lever; an equalizing shaft fitted with rocker arms; a universal joint member connected with said rocker arms, said universal joint member including a rod connected with the brake rod, a spring mounted thereon and means for regulating the tension of the spring; a brake mechanism and means for operably connecting the brake mechanism with the equalizing shaft.

4. The combination of a hauling vehicle, including means for coupling the same to a coupling bar carried by a trailer; a trailer fitted with a coupling bar having a limited floating movement; a rocking lever pivoted to the trailer frame; a brake rod connected with the rocking lever; suitable braking mechanism connected with said brake rod; means for manually actuating said rocking lever and brake mechanism and means adapted to be applied and released through the coordination of the coupling mechanism of the trailer and hauling vehicle with said rocking lever, effected through a difference in the relative movement of the respective vehicles, whereby said brake mechanism may be automatically applied or released.

5. The combination of a hauling vehicle, including means for coupling the same to a coupling bar carried by a trailer; a trailer fitted with a coupling bar having a limited floating movement; a rocking lever pivoted to the trailer frame; a brake rod connected with the rocking lever; suitable braking mechanism connected with said brake rod; means for manually actuating said rocking lever and brake mechanism, an equalizing shaft fitted with rocker arms; a universal joint member connected with said rocker arms; said universal joint member including a rod connected with the brake rod; a spring mounted thereon adapted to be compressed by the manual application of the brake mechanism, whereby the brake mechanism may remain applied upon a backward movement of the hauling vehicle to effect a coupling relation with the trailer until manually released.

6. A combination of a hauling vehicle including means for coupling the same to a coupling bar on the trailer, a trailer fitted with a coupling bar having a limited floating movement, a rocking lever pivoted on the trailer frame and having a brake operating rod secured thereto, brakes on the trailer, the said coupling bar being adapted to contact with the rocking lever to set the trailer brakes upon increased speed of the trailer with reference to the hauling vehicle, and manual means for operating the rocking lever to set the trailer brakes.

In testimony whereof, I sign this specification.

ORRA E. BYRON.